March 19, 1957 J. HOHL 2,785,750
RING GASKET CUTTING MACHINE
Filed Dec. 15, 1953 8 Sheets-Sheet 1

Inventor
JOHN HOHL

March 19, 1957  J. HOHL  2,785,750
RING GASKET CUTTING MACHINE
Filed Dec. 15, 1953  8 Sheets-Sheet 3

Inventor
JOHN HOHL

By Rule and Hoge,
Attorneys

March 19, 1957 J. HOHL 2,785,750
RING GASKET CUTTING MACHINE
Filed Dec. 15, 1953 8 Sheets-Sheet 4
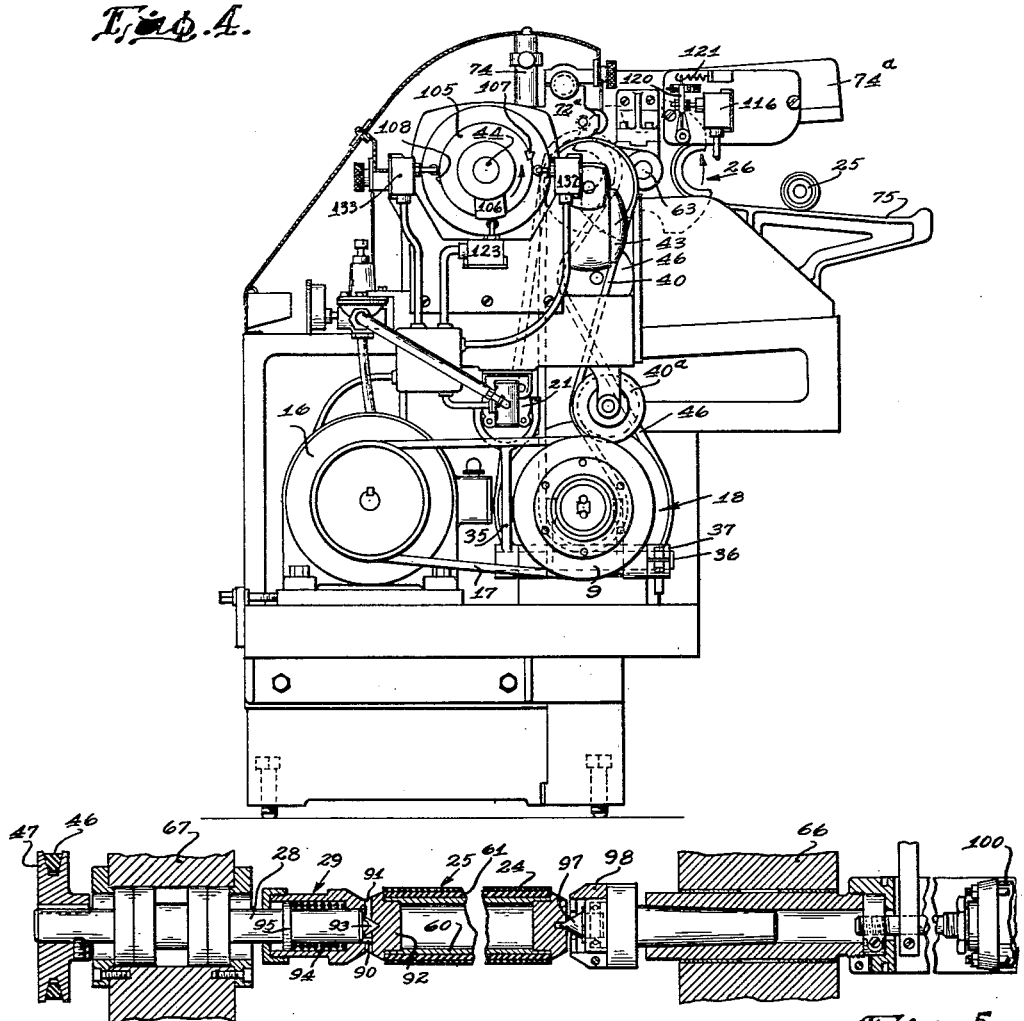
Fig. 4.
Fig. 5.
Fig. 6.
Inventor
JOHN HOHL
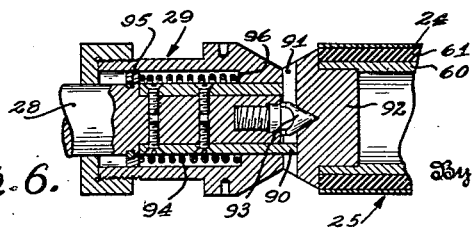
Attorneys March 19, 1957  J. HOHL  2,785,750
RING GASKET CUTTING MACHINE
Filed Dec. 15, 1953  8 Sheets-Sheet 5

Inventor
JOHN HOHL
By Rule and Hoge.
Attorneys

March 19, 1957 — J. HOHL — 2,785,750
RING GASKET CUTTING MACHINE
Filed Dec. 15, 1953 — 8 Sheets-Sheet 7
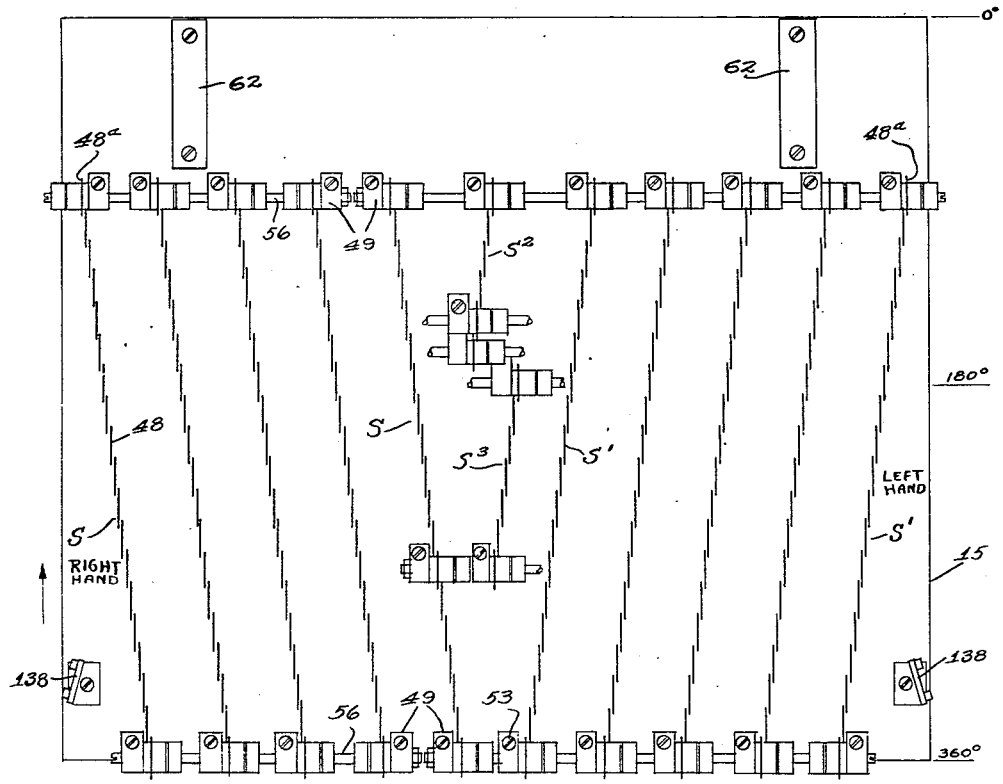
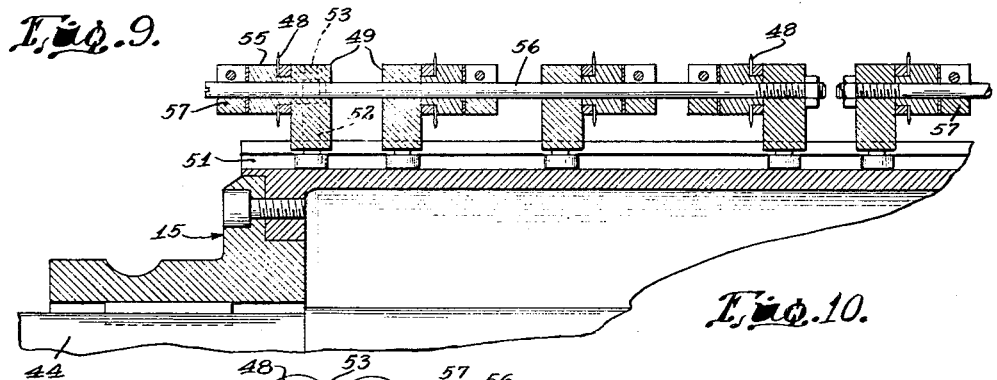
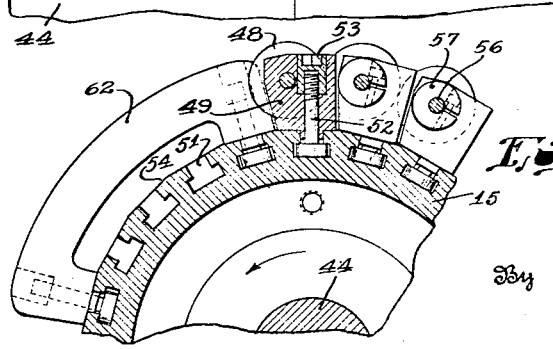
Inventor
JOHN HOHL March 19, 1957    J. HOHL    2,785,750
RING GASKET CUTTING MACHINE
Filed Dec. 15, 1953    8 Sheets-Sheet 8

Inventor
JOHN HOHL
By Rule and Hoge.
Attorneys

United States Patent Office 2,785,750
Patented Mar. 19, 1957

2,785,750

RING GASKET CUTTING MACHINE

John Hohl, Toledo, Ohio, assignor to Owens-Illinois Glass Company, a corporation of Ohio Application December 15, 1953, Serial No. 398,349

21 Claims. (Cl. 164—61)

My invention relates to machines for cutting tubes into short lengths or rings for various uses.

The machine as herein illustrated and described is particularly adpated for cutting tubes of rubber or like materials into rings such as are extensively used as sealing gaskets in closure caps for bottles, jars or other containers. The requirements of such a machine are exacting. The gaskets must be cut accurately to uniform sizes or lengths within close tolerances. The individual gaskets must be completely severed from the tube and from adjoining gaskets and free from slivers, rough edges or other irregularities. A further practical requirement of such machine is rapidity of operation and large output.

An object of my invention is to provide a machine which will satisfactorily meet these requirements. The invention is embodied in a machine of the type in which the tubes of rubber or other material to be cut are mounted on cylindrical mandrels. Each mandrel, with the tube thereon, is rotated about its axis while cutter blades or cutters are brought into engagement with the rotating tube and cut it into a multiplicity of individual rings. Prior art machines of this general type in which the rings or gaskets are cut singly and in succession are comparatively slow so that their output is unsatisfactory from a commercial standpoint. Prior art machines in which a multiplicity of cutters are spaced to correspond to the length of the rings or gaskets to be cut, as measured in the direction of their axis, are open to serious objections. The simultaneous engagement of the cutters with the tube which is being cut, places a teriffic drag on the tube, particularly if the knives or cutters advance into the tube at a reasonable speed. This drag stretches the tube so that the rings or gaskets are cut inaccurately and also cuts slivers and sometimes tears the tubes, resulting in a total loss. The thickness of the knives when narrowly spaced to correspond to the length or dimension of the rings distorts the rings and produces a binding action.

An object of the present invention is to provide a machine which overcomes the above objections and which cuts the gaskets with accuracy and rapidity.

The present invention provides a machine in which a multiplicity of knives are arranged in spiral formation on the cutter drum or cylinder, the knives being spaced apart peripherally of the drum a sufficient distance to permit each knife to completely sever a ring from the tube before the next succeeding knife in the spiral contacts the rotating tube or commences to cut. In order to keep the diameter of the cutter drum within practical dimensions, a plurality of spiral series of cutters are provided. These include right and left hand spiral series so arranged that each individual cutter operates at the outer end portion of the tube, that is, the end of the tube or tube section which is nearest the end of the mandrel.

Referring to the accompanying drawings:

Fig. 4 is an end elevational view as seen from the left hand end of the machine;

Fig. 5 is a longitudinal section of the mandrel and its driving spindle;

Fig. 6 is a sectional view on a larger scale of a portion of Fig. 5, showing particularly the driving connections between the driving spindle and the mandrel;

Fig. 9 is a development of the cutter drum;

Fig. 10 is a sectional detail showing cutter discs and their mounting on the drum;

Fig. 11 is a fragmentary cross sectional view of the cutter drum and cutters;

Figure 1:
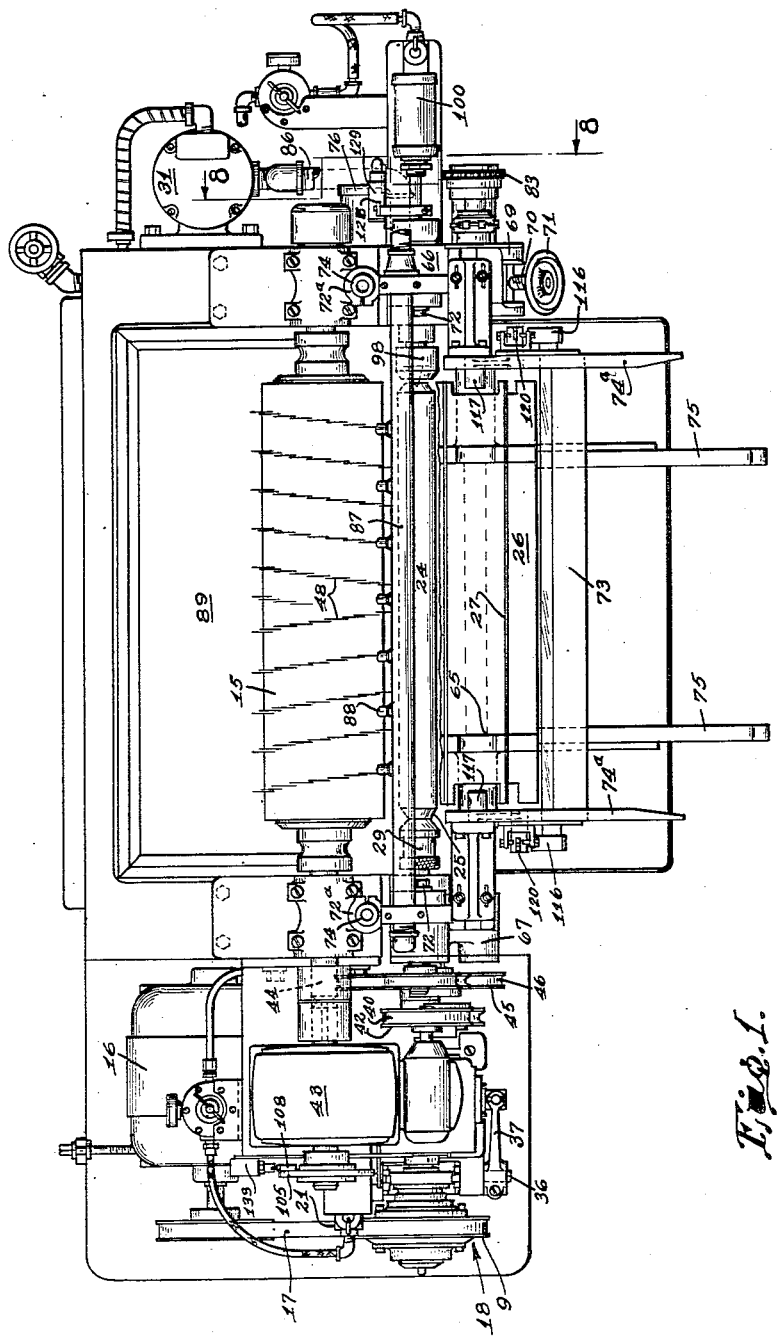
Fig. 1 is a plan view of the machine.
Figure 2:
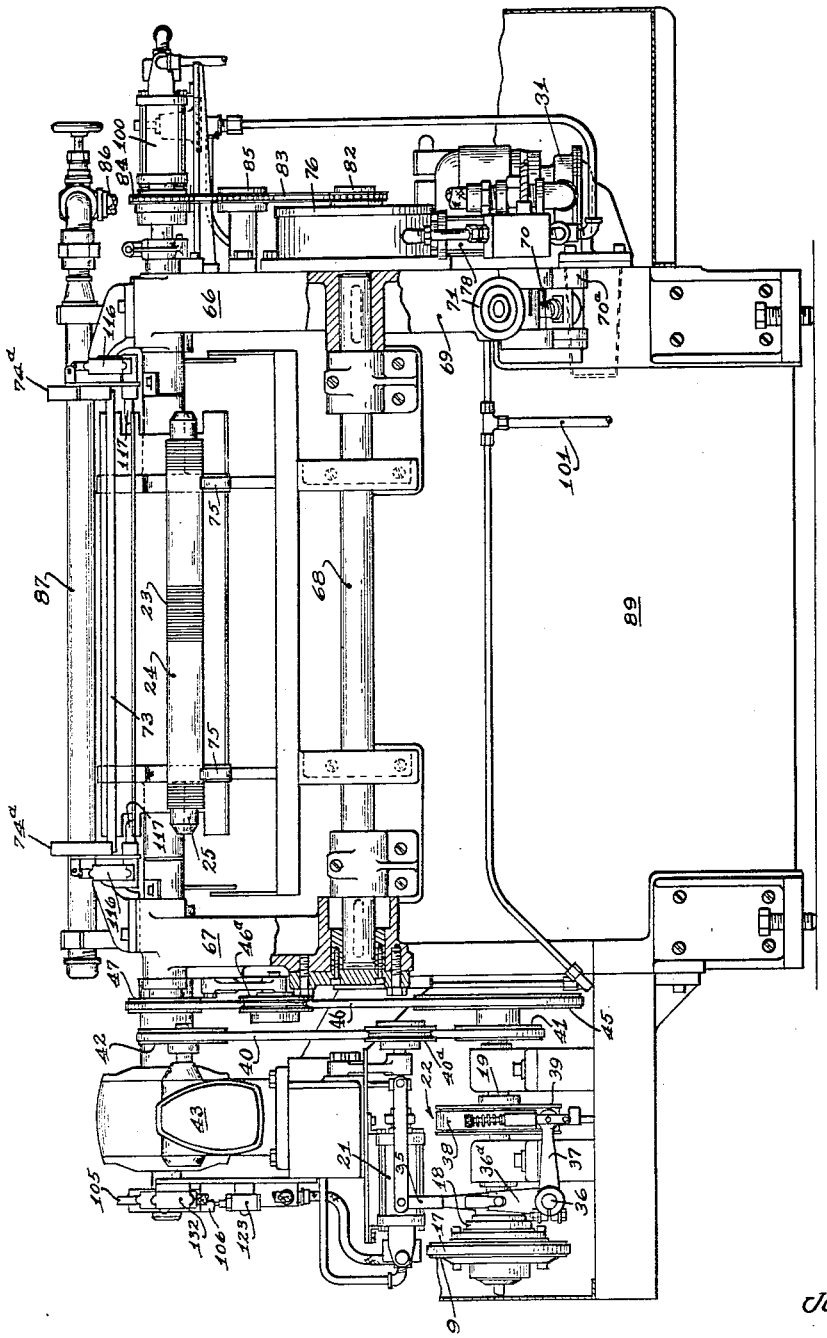
Fig. 2 is a part sectional elevational view of the machine.

A brief general description of the machine will first be given, followed by a more detailed description. Referring to the drawings a cutter drum 15 is mounted for intermittent rotation about a horizontal axis and is driven by a continuously running electric motor 16 (Figs. 1 and 4) having driving connections through a belt 17 and clutch 18 with a countershaft 19 (Fig. 2). The countershaft has driving connections with the cutter drum as hereinafter described. The clutch 18 is periodically operated by a piston motor 21 for connecting the drive shaft 19 with the motor 16 and disconnecting the drive shaft when the cutter drum has completed its rotation. A brake 22, also operated by the piston motor 21, is applied when the drive shaft is disconnected for quickly stopping the cutter drum, and is automatically released when the drive shaft is connected with the motor.

Figure 3:
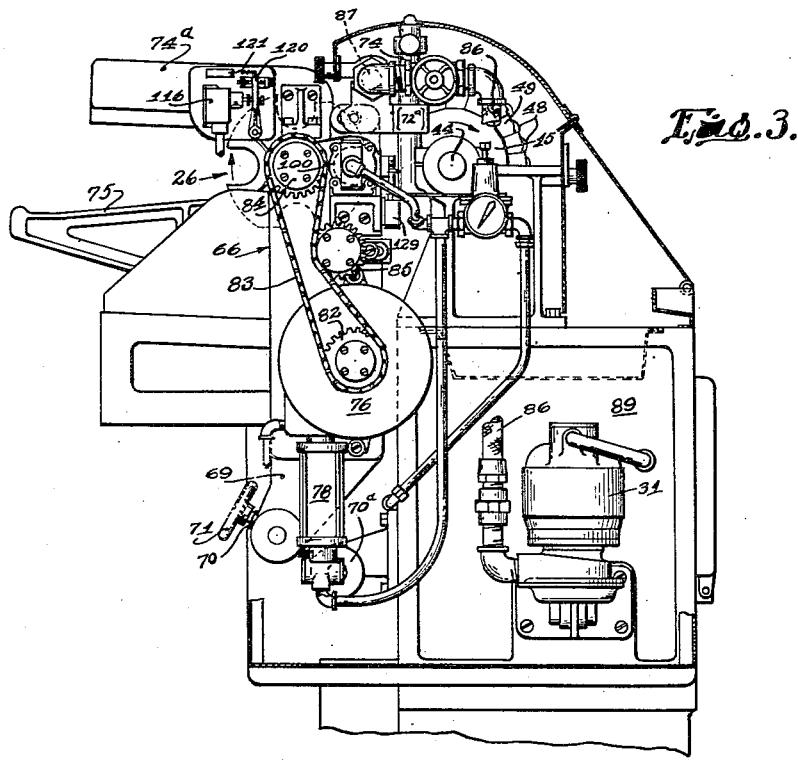
Fig. 3 is an end elevational view as seen from the right hand end of the machine.

The tubes 24 which are to be cut into rings 23 (Fig. 2) are mounted on cylindrical mandrels 25. A mandrel carrier 26 (Fig. 7) is provided with pockets or cradles 27 to receive the mandrels. The mandrel carrier is mounted for rotation about a horizontal axis parallel with that of the cutter drum and is intermittently rotated step by step in alternation with the intermittent rotations of the cutter drum. Each indexing or step rotation of the carrier 26 carries a mandrel 25 from a receiving station 1 at the upper side of the carrier to a cutting station 2 at which the cutters operate. This step rotation of the carrier also moves the mandrel with the severed rings thereon from the cutting station 2 to the bottom station 3 while a preceding mandrel is carried to the discharge station 4. Each mandrel is brought into alignment with a driving spindle 28 (Fig. 5) at the cutting station. A clutch device 29 or driving chuck is then operated to effect the driving connection between the drive spindle 28 and the mandrel. The drive spindle 28 is geared to the countershaft 19 and operates to rotate the mandrel while the cutter drum is rotating. The mandrel is rotated at a comparatively high speed so that it makes several complete rotations while each cutter is severing a ring from the tube on the mandrel. A pump 31 (Figs. 1 and 3) operates to circulate water on other cooling and lubricating fluid for cooling and lubricating the cutters.

A more detailed description of the machine is as follows:

The motor 16, which runs continuously while the machine is in operation, operates through the belt 17 to drive the pulley 9 which is mounted loose on the countershaft 19 and is connected to or forms one element of the clutch. The air motor 21 operates to engage and disengage the clutch and at the same time actuates the brake 22. The connections for operating the clutch include a rock arm 35 (Fig. 4), a rock shaft 36 and a rock arm 36ᵃ (Fig. 2). A rock arm 37 on the shaft 36 is connected to apply the brake band 38 to brake pulley 39 keyed to the countershaft 19.

Driving connections from the countershaft 19 to the cutter drum shaft include a belt 40 trained over a pulley 41 on the countershaft and a pulley 42 which is connected through a speed reducer 43 with the cutter drum shaft 44. Driving connections from the countershaft 19 to the mandrel driving spindle 28 include a pulley 45 on the countershaft, a belt 46 trained over the pulley 45 and a pulley 47 keyed to the spindle 28 (Fig. 5). Tension and take-up wheels 40ᵃ and 46ᵃ maintain tension on the belts 40 and 46 respectively.

The cutter drum 15 is cylindrical or polygonal in form. The cutters preferably are in the form of discs 48 having peripheral cutting edges. Means for mounting the discs (Figs. 9 to 11) include cutter blocks 49 mounted on the drum. The drum is formed in its periphery with slots 51 extending parallel with the drum shaft the full length of the drum. The slots 51 are undercut or T shape in cross section. Bolts 52 (Fig. 11) are formed with heads slidably mounted in the slots 51 and serve as means for clamping the cutter blocks to the drum face, each bolt having a clamping nut 53 threaded thereon.

The cutter blocks 49 seat on flat surfaces 54 on the cutter drum, said surfaces giving the drum a polygonal formation. Each cutter disc 48 is directly mounted for free rotation on a bearing block 55. The bearing blocks are in turn mounted on rods 56 (Fig. 10) which also extend through the cutter blocks 49. The bearing blocks 55 are secured in an adjusted position by clamping collars 57 on the rods 56. Each of the rods 56 preferably extends through a plurality of the cutter blocks thereby giving rigidity to the structure and preventing any tilting movement of the cutter blocks.

Figure 7:
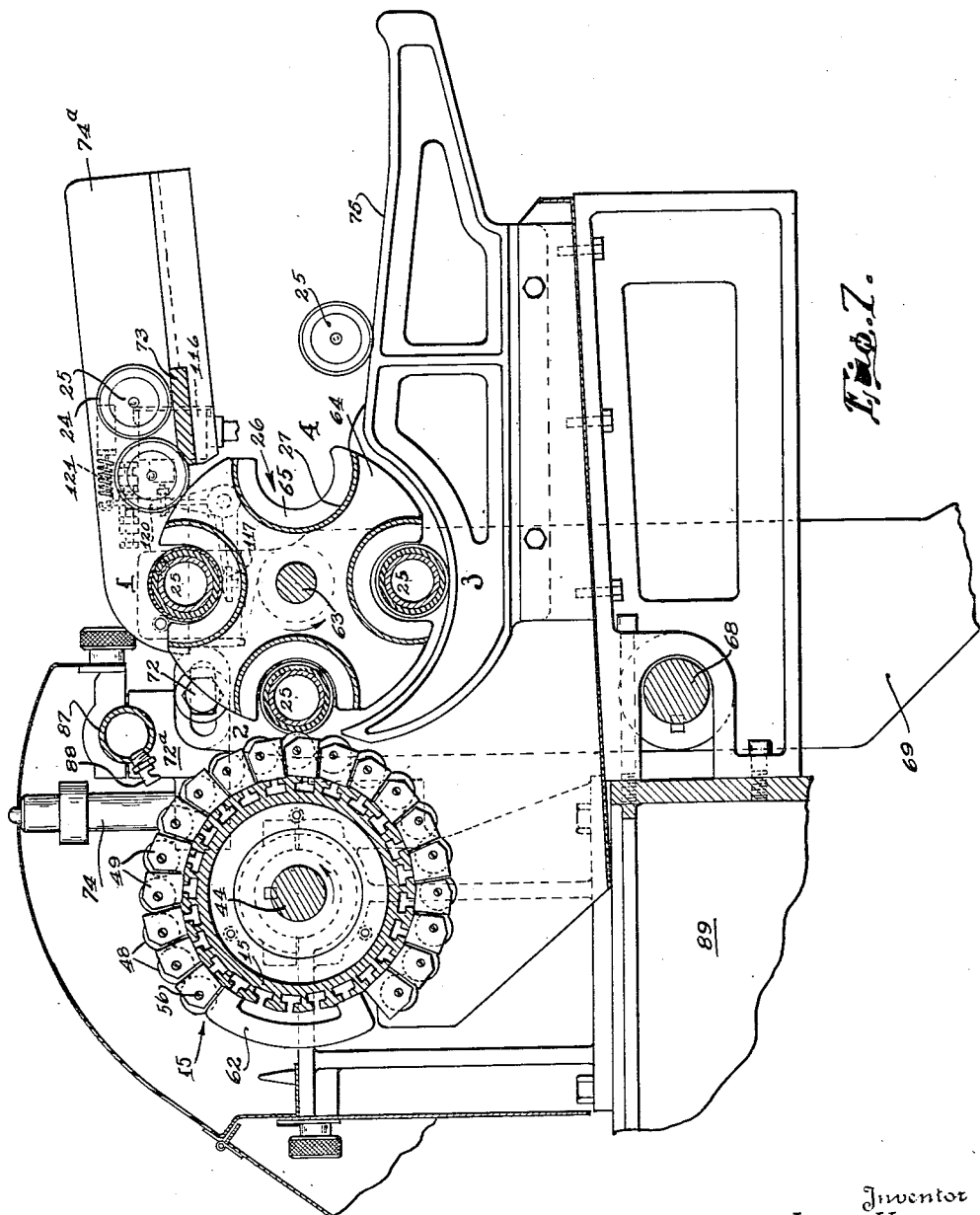
Fig. 7 is a cross section of the machine.

The cutters 48 are arranged in a plurality of spiral series, each series including a multiplicity of the cutters and each series extending less than a complete circumference of the drum as shown in Figs. 7 and 9. As shown in the developed view (Fig. 9) the cutters include a plurality of right hand series S and a plurality of left hand series S¹. The pitch of these spiral series is such that each series cuts into rings a length of a tube 24 equal to the spacing between adjoining series as measured lengthwise of the cutter drum. With this arrangement the entire tube 24 (except the discarded end pieces) is cut into rings or ring gaskets of the same size. Two short series of cutters S² and S³ are positioned at the central portion of the drum surface, between the adjacent converging right and left series S and S¹, thereby providing for cutting the central portion of the tube. This arrangement provides adequate room for the mountings of the cutter discs at the central portion of the drum.

The mandrels 25 are tubular in form and each comprises an inner metal tube or body 60 (see Figs. 5, 6) and an outer tube 61 consisting of rubber or other comparatively soft material. The tubes 24 are mounted by sliding them lengthwise onto the mandrels. As shown in Fig. 7 the mandrel at the cutting station 2 is held in such position that a cutter while moving through said station can completely sever a ring gasket from the rotating tube. The cutters 48 are in step relation and spaced apart in a direction circumferentially of the drum a sufficient distance to permit each cutter disc to completely sever a ring from the tube before the next succeeding cutter comes into contact with the tube. With this arrangement no two adjacent cutters are in contact with the tube at the same time. This avoids the crowding and compression of a tube section or ring by closely adjacent cutters, prevents distortion of the tube and provides for a clean severance of each ring gasket, minimizing the strain or pull of the cutters on the tube and prevents any uneven cutting or the formation of slivers. The blank surface of the drum between the ends of the series of cutters is bridged by arc shaped bearing plates 62 which are positioned at the cutting station 2 while the cutter drum is at rest in its normal start and stop position, and serve to hold the mandrels in position on the carrier 26.

Figure 8:
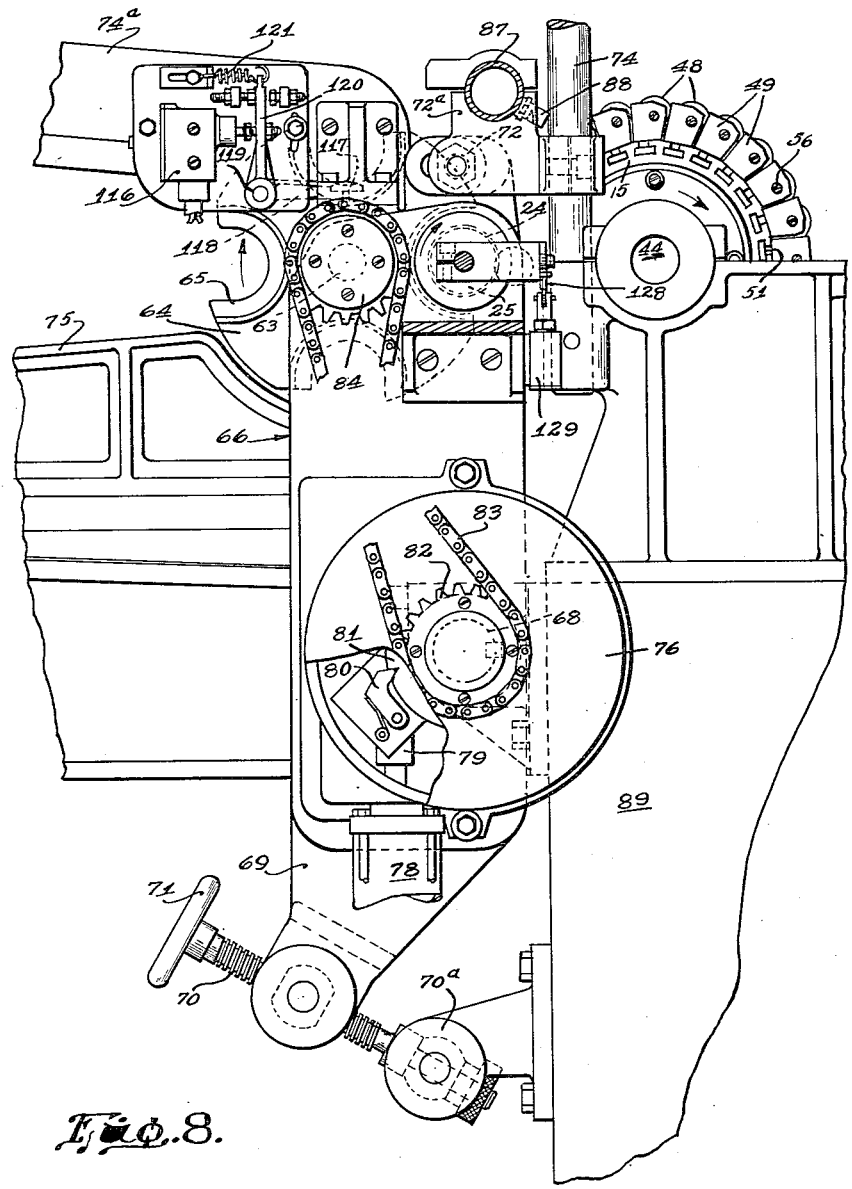
Fig. 8 is a part sectional view, the section being substantially at the line 8—8 on Fig. 1.

The mandrel carrier 26 includes a central shaft 63 and star wheels 64 mounted thereon and forming supports for the cradles 27. Arc shaped adapters 65 are removably attached to the cradles 27, and are interchangeable with other adapters of sizes corresponding to different sized mandrels and tubes. The mandrel carrier 26 is adjustable toward and from the cutter drum as required for different size mandrels and tubes. For this purpose the carrier shaft 63 is journaled in a carrier frame comprising frame members 66 and 67 keyed to a rock shaft 68 which is mounted on the main frame of the machine. The carrier frame includes an arm 69 (Fig. 8) extending downwardly below the shaft 68 and having a screw threaded connection with an adjusting shaft 70 carrying a hand wheel 71. The screw shaft 70 is journaled in a stationary bearing bracket 70ᵃ. Rotation of the hand wheel rocks the frame about the axis of the shaft 68 for adjusting the mandrel carrier toward or from the cutter drum, the required position of the mandrel carrier being determined by the size of the mandrels and tubes. The carrier frame is locked in adjusted position by clamping bolts 72 (Figs. 7, 8) in brackets 72ᵃ clamped to posts 74 on the machine frame.

Mounted on the carrier frame 66 is a frame comprising a platform 73 to receive the mandrels and guide arms 74ᵃ forming end guides for the mandrels. Mandrels 25 placed on the platform 73 are fed by gravity to the carrier 26, a mandrel dropping into position in a cradle 27 as the carrier is indexed and thereby brought to the top position 1. Guide bars 74ᵃ guide the mandrels into proper position lengthwise of the mandrel carrier. Each step rotation of the mandrel carrier moves the mandrel with the severed rings from the cutting station 2 to station 3, while the preceding mandrel advances from station 3 and is discharged onto a support 75.

The means for indexing the mandrel carrier 26 (Figs. 3 and 8) includes a rotary table 76 mounted on the frame 66 for rotation about the axis of the shaft 68, a piston motor or air cylinder 78 comprising a piston rod 79 on which is mounted a pawl 80 and a ratchet wheel 81 fixed to the table 76. A sprocket wheel 82 attached to the table 76 drives a chain 83 trained over said sprocket wheel and a sprocket wheel 84 of the same size keyed to the mandrel carrier shaft. The operation of the piston motor 78 is electrically controlled as hereinafter described. Each upward stroke of the piston rotates the indexing table 76 through an arc of 90° and thereby rotates the mandrel carrier through an equal arc. A tension and take-up wheel 85 (Fig. 3) maintains the required tension on the chain 83.

The pump 31 is operated continuously while the machine is running for circulating the cooling and lubricating fluid by which the cutters are kept cool and lubricated. The water or other lubricating fluid is conducted from the pump through a pipe 86 to a pipe or conduit 87 positioned over and extending lengthwise of the cutter drum. Nozzles 88 positioned at intervals lengthwise of the conduit 87 direct sprays of the cooling liquid downwardly against the cutters. The liquid is discharged into a tank 89 from which it may be recirculated through the pump.

The means for connecting and disconnecting the drive spindle 28 to and from the mandrel 25 is as follows:

Referring to Figs. 5 and 6 the connecting device or chuck 29 includes a key 90 attached to the spindle and projecting into a slot 91 formed in the head 92 of the mandrel. A centering pin 93 threaded in the end of the driving spindle is formed with a conical head to enter a central opening in the mandrel head 92. A coil spring 94 housed within the chuck 29 is held under compression between a collar 95 keyed to the spindle and a shoulder 96 formed on the chuck. The opposite end of the mandrel is held by a live center 97 which is mounted for free rotation in a head 98. An air operated piston motor 100 (Figs. 1 and 5) with its piston in line with the axis of the mandrel, is connected to the head 98 for withdrawing the live center from the mandrel. When the live center is withdrawn the driving chuck 29 is released from the mandrel by the expansion of the coil spring 94 which moves the chuck forward and pushes the mandrel free from the key 90 and centering pin. The mandrel being thus disengaged is ready for the indexing movement by which it is carried to station 3 and another mandrel positioned in line with the drive spindle 28.

Air under pressure for operating the several air motors or cylinders is supplied through an air pressure line 101 (Fig. 2) including pipes extending to the several air motors, namely, the motor 21 for actuating the clutch and brake, the motor 78 for indexing the mandrel carrier, and the motor 100.

Figure 12:
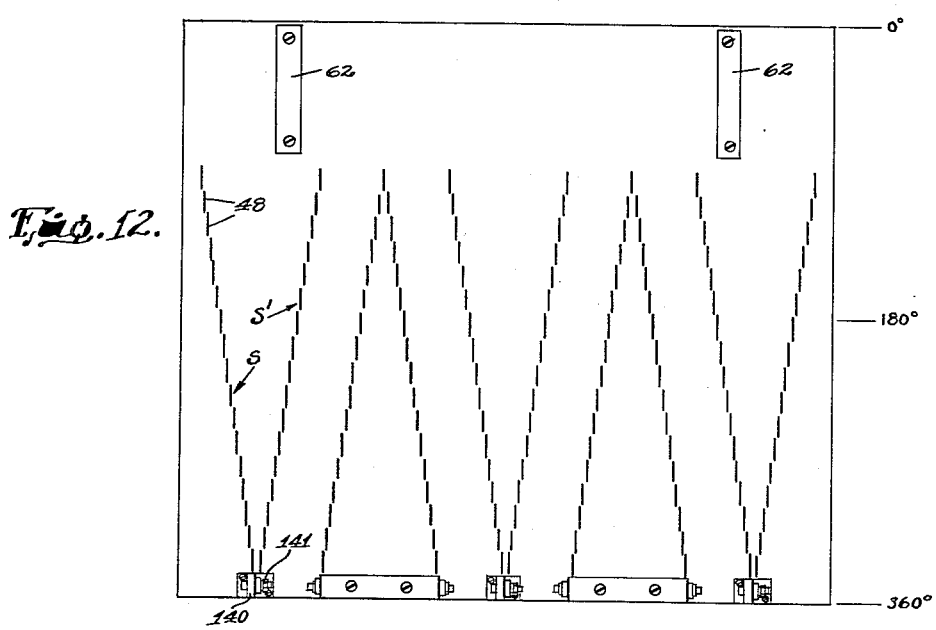
Fig. 12 is a view similar to Fig. 9 showing a modified arrangement of the cutters on the cutter drum.

Fig. 12 shows a modified arrangement of the cutters on the cutter drum. In this arrangement the right and left hand series of cutters S and $S^1$ are arranged in pairs in V shape formation, the V's extending alternately in opposite directions circumferentially of the drum. In each of said pairs of series the individual cutters are arranged in pairs, with the two cutters of each pair at the same position of advancement circumferentially of the drum so that the two cutters are brought simultaneously into cutting position and operate to simultaneously sever rings from the two ends of the tube on the mandrel.

Figure 13:
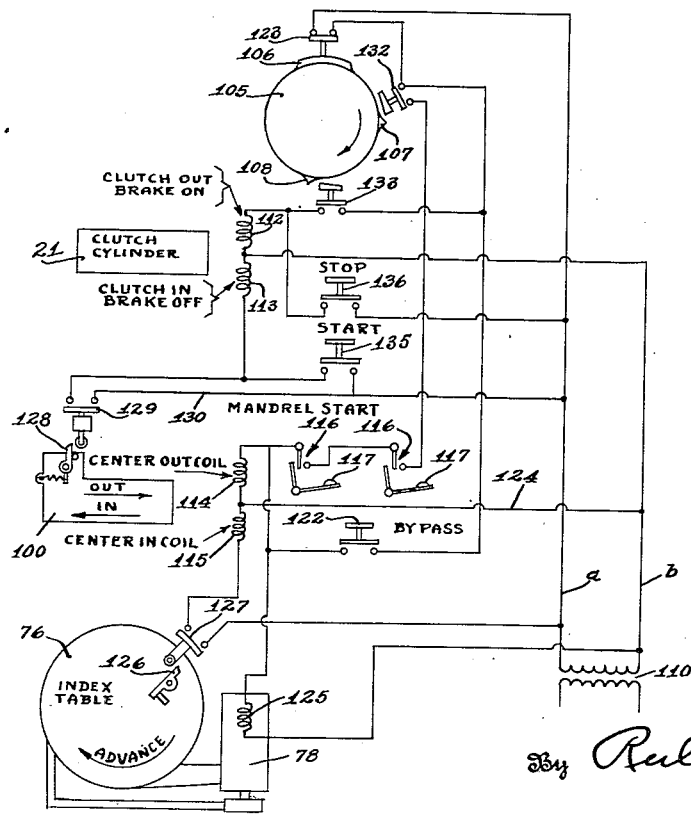
Fig. 13 is a wiring diagram of the electrical control mechanism.

The electrical control system for controlling the various operations of the machine will be understood by reference to Fig. 13. This mechanism includes a cam disc 105 (Figs. 4 and 13) mounted on the cutter drum shaft for rotation therewith and having cams 106, 107 and 108 on its periphery. Electric current is supplied through a transformer 110. The main lines $a$ and $b$ extending from the secondary of the transformer are connected to the various switches and control devices. The air motor or cylinder 21 for operating the clutch and brake is of conventional construction including electromagnetic valve means for controlling the operation of the cylinder. Such means comprises a coil 112 which when energized operates the cylinder to release the clutch and apply the brake to the countershaft 19 (Fig. 2), and the coil 113 for connecting the clutch and releasing the brake. The cylinder or motor 100 is of like construction and comprises a coil 114 for causing the cylinder to retract the live center 97 (Fig. 5) and permit the spring 94 to disconnect the mandrel from the driving spindle. A coil 115 operates the motor valve into a position to reverse the motor 100 and connect the mandrel with the driving spindle.

Switches 116 located adjacent to the opposite ends of the mandrel carrier are held in closed position by a mandrel at station 1 and automatically open as the mandrel moves away from said station during the indexing movement. The means for actuating the switches 116, shown for example in Figs. 7 and 8, includes push buttons 117. Each push button is on a rock arm 118 on a rock shaft 119, said rock shaft carrying an arm 120 for operating the switch 116. Coil spring 121 attached to the arms 118 are under tension and apply a counter-clockwise torque to the rock shaft 119 and thereby holding the buttons 117 in their lifted position with the switches open as shown in Fig. 13, except while there is a mandrel in the cradle at station 1. As a mandrel moves into station 1 it rides on to the buttons 117 and pushes them down. The weight of the mandrel in the cradle holds the buttons down and the switches closed. The push buttons 117 are also adapted to be operated manually, being located at opposite ends of the mandrel carrier as a safety measure.

Operation

The operation is as follows:

Assuming the motor 16 and pump 31 to be operating and a mandrel in the cradle at station 1, a by-pass switch button 122 is operated manually to complete a circuit which extends from the main $a$ through a switch 123 held closed by the cam 106, by-pass switch 122, coil 114 and wire 124 to main $b$. The coil 114 being energized causes the cylinder 100 to retract the live center and effect a release of the mandrel from the driving spindle at the cutting station, the cutting of the tube having been completed. Closing of the by-pass switch 122 also completes a parallel circuit through a coil 125, termed the index table retract coil. This coil operates the magnetic control valve for the motor 78 so that the piston 79 (Fig. 8) is reciprocated and thereby indexes the table 76 and the mandrel carrier so that the mandrel is advanced from station 1 to the cutting station 2. As the index table is completing this indexing movement a one way dog 126 thereon closes the switch 127, thus completing a circuit through the coil 115 so that the cylinder 100 operates to move the live center in and clutch the mandrel at the cutter station to the drive spindle. As the cylinder 100 is completing its movement a one way dog 128 thereon closes the switch 129. This makes a circuit from the main $a$ through wire 130, switch 129 and coil 113, thereby causing the cylinder 21 to release the brake and actuate the clutch. This connects the main motor 16 to the countershaft for rotating the cutter drum and the mandrel at the cutting station. The cutter drum starts its rotation from a normal stop position in which the blank section of the drum is at the cutting station.

The rotation of the drum is in a direction such that the cutters nearest the outer ends of the drum, namely, in the positions 48ᵃ (Fig. 9) sever the end portions of the tube, the remaining cutters of each series then operating in succession or progression away from the nearest or outer end of the mandrel. Thus each knife cuts a ring from the end of the tube nearest the end of the mandrel. This avoids any crowding and distorting of the tube and binding of the cutters which would result from a reverse operation. It will be noted that the first cutter discs of each series all operate simultaneously thereby severing the tube into sections. Each section is then cut into individual ring gaskets by one of the spiral series of cutters.

Means for removing the severed outer end portions of a tube 24 comprise ejecting devices 138 (Fig. 9) mounted on the cutter drum. These devices are in the form of blades or cams which may be positioned with their leading ends running in the path of the end cutter blades 48ᵃ to engage the severed ends of the tube and are inclined in a direction to cam the severed ends outwardly along the mandrel, ejecting them from the mandrel.

The cam disc 106 being connected to the cutter drum makes one complete rotation before it is arrested in the normal stop position shown in the diagram (Fig. 13). Just before the cam disc completes its rotation the cam lug 107 operates a switch 132, thus momentarily closing the switch. The cam lug 108 also closes the switch 133 immediately before the cam disc has completed its rotation. The closing of the switch 133 completes a circuit for the clutch cylinder coil 112 so that the clutch is released and the brake applied to the countershaft, thereby stopping the cutter drum and mandrel driving spindle. This completes a cycle of operations.

The momentary closing of the switch 132 as one cycle is completed, automatically starts a new cycle by completing a circuit through the coil 114 which withdraws the live center for releasing the mandrel with the severed rings thereon. The circuit for the coil 114 extends through the switches 123, 132 and 116. If there is no mandrel in the upper cradle at station 1 the switches 116 remain open and the cutter drum and mandrel driving spindle remain at rest. The switch 123 is held closed by its cam 106 only while the drum is in its normal position of rest, namely, the starting position. Starting of the cutter drum by placing a mandrel in the cradle at station 1 or closing the bypass switch 122 will not start the drum from any other position.

A push button switch 135 when closed completes a circuit through the coil 113 directly across the mains *a* and *b*. The switch 135, therefore, serves as an emergency starting switch for releasing the brake and connecting the clutch for starting the rotation of the cutter drum and mandrel from any position. An emergency stop switch 136 is in circuit with the coil 112 and when closed connects the coil directly across the mains *a* and *b*, thereby releasing the clutch and applying the brake for stopping the cutter drum and mandrel at any position.

Fig. 12 illustrates a modified arrangement of the cutter discs 48 on the drum. As here shown a plurality of pairs of series of cutters S, S¹ are provided, each pair including right and left hand series arranged in a V shape formation. The several V's extend alternately in opposite directions circumferentially of the cutter drum. The spacing of the several series of cutters in a direction lengthwise of the drum is such that an entire tube 24, except the discarded end pieces, is cut into rings of uniform size.

With a pair of right and left hand series of cutters in V form, the two series of knives cut rings simultaneously from the two ends of a tube or tube section, each series cutting progressively toward the middle of the tube section. Objectionable crowding of the uncut portion of the tube section is thus avoided.

By arranging the cutters in right and left hand series, the required diameter of the cutter drum is reduced as compared with the use of a single series of cutters. By the use of a plurality of both right and left hand series of cutters as arranged in either Fig. 9 or Fig. 12, the diameter of the cutter drum is still further reduced. In this manner the diameter of the drum may be kept within practical limits without decreasing the output. Although if a plurality of cutters are operating simultaneously, they are far enough apart that the accuracy is not impaired and the cutting of slivers is avoided.

A modified form of mounting devices 140 (Fig. 12) for the disc cutters 48 includes clamping nuts 141 or means for holding the cutters in fixed position on the cutter drum. The construction permits each disc to be rotatively adjusted through an arc, for example, 60°, when the cutting edge becomes dull, presenting a new sharp cutting edge. Thus the cutters may be used in at least six different cutting positions before having to be replaced.

Modifications other than those herein disclosed may be resorted to within the spirit and scope of my invention.

I claim:

1. A machine for cutting tubes into rings, comprising a mandrel having mounted thereon a tube to be cut into a multiplicity of said rings, means for rotating the mandrel and tube about the axis of the mandrel, a cutter drum mounted for rotation about an axis parallel with the axis of the mandrel, a multiplicity of cutters mounted on the said drum and spaced lengthwise of the drum at distances axially of the drum equal to the axial length of the rings to be cut, the cutters including two groups, the cutters of each group being arranged spirally on the drum with the two groups in a V-shape formation, the groups of cutters being symmetrically arranged with respect to a plane normal to the axis of the cutter drum, and means for rotating the drum and bringing the cutters of each group singly and in succession into contact with the rotating tube and thereby cutting the tube into rings.

2. A machine for cutting tubes into rings, comprising a mandrel on which a tube to be cut is mounted, means for rotating the mandrel and tube about the axis of the mandrel, means for cutting the tube into a multiplicity of rings, said cutting means including two series of cutters each comprising a multiplicity of cutters, means for bringing the cutters of each series into cutting engagement with the tube singly and in succession and cutting rings successively from the tube, the two series of cutters being symmetrically arranged on opposite sides of a plane normal to the axis of the mandrel and operative to cut rings concurrently from opposite ends of the tube, the cutters of one series being paired with those of the other series, with the cutters of each pair brought simultaneously into cutting position, the cutters of each pair when at the cutting position being nearer together than those of the next preceding pair, whereby the tube is cut into rings progressively from the ends of the tube toward the middle.

3. The machine defined in claim 2, the cutting means comprising a cylindrical drum having its axis parallel with the axis of the mandrel and each of said series of cutters mounted on the drum and arranged spirally on the drum, and means for rotating the drum on its axis.

4. The machine defined in claim 3, each of the cutters being in the form of a disc with a continuous peripheral cutting edge.

5. The machine defined in claim 4, including means to clamp each disc in a fixed position on the drum, each disc being rotatively adjustable about its own axis for bringing successive portions of the cutting edge to a cutting position.

6. The machine defined in claim 4, the cutter discs being mounted for free rotation about their axes.

7. A machine for cutting tubes into rings, said machine comprising a mandrel carrier mounted for rotation about a horizontal axis, said carrier comprising cradles to receive mandrels loaded with tubes thereon, means for feeding the loaded mandrels into the cradles by a bodily movement of each loaded mandrel into its cradle, a cutter drum mounted at one side of said carrier and rotatable about an axis parallel with the axis of said carrier, cutters mounted on said drum, means for rotating the mandrel carrier intermittently step by step and thereby bringing the cradles with the mandrels in succession to a cutting station, means for rotating each mandrel in its cradle while at the cutting station, and means for rotating the cutter drum and causing the cutters to sever each tube into a multiplicity of rings while the tube is rotating at the cutting station, the cutters being arranged in rows extending spirally along the cylindrical surface of the cutter drum, the rows being convergent, the rotation of the cutter drum being in a direction such that the succeeding cutters of one row as they reach the cutting station are progressively nearer to the cutters in the other row at said station, whereby rings are cut from both ends of the tube concurrently 8. A machine for cutting tubes into rings, said machine comprising a cutter drum, cutters mounted thereon, a mandrel carrier mounted for rotation about an axis parallel with the drum, said carrier comprising mandrel holders, each adapted to hold a mandrel loaded with a tube thereon, means for feeding the loaded mandrels into the mandrel holders, means for intermittently rotating the said carrier step by step through angular distances corresponding to the spacing of said holders and thereby bringing the loaded mandrels in succession to a cutting station, means for rotating each mandrel while at said station, and simultaneously rotating the cutter drum and bringing the cutters in succession into cutting engagement with the tube at said station and thereby cutting the tube into rings, the cutters being arranged in spiral rows at opposite sides of a plane normal to the axis of the drum, the rows being convergent and the rotation of the drum being in a direction such that as the cutters are brought to the cutting station the succeeding cutters in each row are brought progressively nearer to said plane.

9. The machine set forth in claim 8, the means for rotating the mandrels at the cutting station comprising a driving spindle in axial alignment with the mandrel at said station, means for rotating the driving spindle, and means for chucking it to the mandrel.

10. A machine for cutting tubes into rings, comprising means for mounting a tube for rotation about its axis, means for rotating the tube, a cylindrical cutter drum mounted at one side of and parallel with said tube, means for rotating the drum about its axis, a plurality of series of cutters mounted on the drum, the cutters of each series being arranged in the form of a spiral extending circumferentially of the drum with the cutters of each series spaced circumferentially and axially of the drum and positioned to be brought in succession into cutting engagement with the tube by the rotation of the drum, the said series of cutters comprising a plurality each of right and left-hand series positioned respectively at opposite sides of a plane normal to the cutter drum, the right and left-hand series being symmetrically arranged with respect to said plane.

11. A machine for cutting tubes into rings comprising means for mounting a tube for rotation about its axis, means for rotating the tube, a cylindrical cutter drum mounted at one side of and parallel with said tube, means for rotating the drum about its axis, a plurality or series of cutters mounted on the drum, the cutters of each series being arranged in the form of a spiral extending circumferentially of the drum with the cutters of each series spaced circumferentially and axially of the drum and positioned to be brought in succession into cutting engagement with the tube by the rotation of the drum, the drum having guideways formed in its cylindrical surface and extending parallel with the axis of the drum, a plurality of cutter blocks slidably mounted in each guideway and individually adjustable lengthwise of the guideway, means for clamping the said blocks in adjusted position, rods mounted in said blocks each rod extending through a plurality of said blocks, the cutters being in the form of disks rotatably mounted on said rods with their axes of rotation parallel with the axis of the drum.

12. The combination set forth in claim 11 including bearing blocks mounted on said rods and forming bearings on which the disk cutters are rotatably mounted, and clamping collars mounted on said rod and clamping said bearing blocks to the cutter blocks.

13. A machine for cutting tubes into ring gaskets, comprising a cutter drum and a mandrel carrier mounted side by side for rotation about parallel axes, the mandrel carrier having cradles spaced circumferentially thereof for holding mandrels on which the tubes are mounted, indexing means for automatically rotating the mandrel carrier intermittently step-by-step and thereby bringing the mandrels in succession to a cutting station, means cooperating with the mandrel carrier for feeding a mandrel with a tube thereon into a cradle at each step rotation of the carrier, means for rotating each mandrel with the tube thereon about its axis while at the cutting station, cutters mounted on the cutter drum and arranged in convergent rows extending spirally around the peripheral surface of the drum, automatic means for rotating the cutter drum intermittently in alternation with the step rotations of the mandrel carrier and through a single complete rotation while a mandrel is rotating at the cutting station, the cutters in each of said rows being spaced circumferentially of the drum in positions to engage the tube in succession and each sever a ring gasket from the tube, the cutters in one row being paired with those in the other row, the rotation of the cutter drum being in a direction such that the spacing between the cutters at the cutting station is progressively reduced as each succeeding pair is brought to the cutting station.

14. The machine defined in claim 13, the means for rotating the mandrel while at the cutting station comprising a drive spindle in axial alignment with the mandrel at said station, and automatic means for effecting a driving connection of the spindle to the mandrel when the spindle is brought to said station and disconnecting the spindle when the cutter drum has completed its rotation.

15. The machine defined in claim 13, including an electric motor, a drive shaft, a clutch between the motor and the drive shaft, gearing forming driving connections from the drive shaft to the cutter drum and the mandrel, electro responsive means actuated and controlled by the drive shaft for operating the clutch and releasing the drive shaft and thereby stopping the rotation of the cutter drum and mandrel and for causing the indexing means to effect said step rotation of the mandrel carrier, and means controlled by said indexing means to re-engage the clutch and again start the rotation of the cutter drum and mandrel when the indexing of the mandrel carrier is completed.

16. A machine for cutting tubes into rings comprising a cutter drum, cutters mounted on the periphery of the drum in a spiral series, the drum being mounted for rotation about a horizontal axis, a mandrel carrier mounted for rotation about an axis parallel with the axis of the drum, said carrier comprising cradles spaced circumferentially thereof for holding mandrels on which the tubes are mounted, an indexing mechanism for rotating the mandrel carrier intermittently step by step and thereby bringing the mandrels in succession to a cutting station, a main motor, means providing driving connections from the motor to the cutter drum and to a mandrel at the cutting station, said driving connections including a clutch operative to connect and disconnect the motor to and from the cutter drum and the mandrel at the cutting station, a clutch operating motor for actuating said clutch, an indexing motor for operating said indexing mechanism, a mandrel releasing motor operable to release the mandrel from its driving means, an electrical control system comprising electro responsive means for actuating the clutch operating motor, the indexing motor and the mandrel releasing motor in a predetermined order and timed relation by which the cutter drum is given one complete rotation and then stopped at a stop position, the rotation of the mandrel at the cutting station stopped when the cutter drum is stopped, the mandrel releasing motor operated to release the mandrel at the cutting station and while the cutter drum is at rest, the indexing means operated when the mandrel is released and thereby discharging the mandrel and bringing a succeeding mandrel to the cutting station, and means operated by the indexing means to cause the operation of the mandrel releasing motor and effect a driving connection of the mandrel at said station with its driving means, and means for then operating the said clutch for connecting the main motor with the cutter drum and the mandrel at the cutting station, thereby initiating a succeding cycle of operations.

17. The combination set forth in claim 16, the said electrical control system including cams connected to rotate with the cutter drum, one said cam controlling the operation of the clutch and operable to release the clutch as the drum completes its rotation, another said cam operable to effect the operation of the mandrel releasing motor and to initiate the operation of the indexing motor, means actuated by the indexing mechanism to operate the mandrel releasing motor and connect a mandrel with its driving means, and means actuated by the mandrel releasing motor to effect operation of the clutch and thereby re-establish driving connection from the main motor to the cutter drum and mandrel.

18. The combination set forth in claim 16, said driving connections from the main motor to the cutter drum and mandrel, including a drive shaft, a brake, said clutch being between the main motor and said drive shaft, means operable as the clutch releases the motor from the drive shaft to simultaneously apply the brake to the drive shaft for quickly stopping the drum and mandrel, and means for releasing the brake as the clutch operates to connect the main motor to the drive shaft.

19. A machine for cutting tubes into rings, comprising means for mounting a tube for rotation about its axis, means for rotating the tube, a cylindrical cutter drum mounted at one side of and parallel with said tube, means for rotating the drum about its axis, a plurality of series of cutters mounted on the drum, the cutters of each series being arranged in the form of a spiral extending circumferentially of the drum with the cutters of each series spaced circumferentially and axially of the drum and positioned to be brought in succession into cutting engagement with the tube by the rotation of the drum, the series being symmetrically arranged at opposite sides of a plane normal to the axis of the drum, the series on the opposite sides of the plane being convergent.

20. The combination defined in claim 19, the cutters comprising a pair of series of cutters, the pair being in V-shape formation, the rotation of the drum being in a direction such that the point of the V advances toward the cutting position during the rotation of the drum.

21. The combination set forth in claim 19 including a plurality of V-shaped pairs of said series, said pairs positioned at intervals lengthwise of the drum and arranged with the V's extending alternately in oposite directions.

References Cited in the file of this patent

UNITED STATES PATENTS

| | | |
|---|---|---|
| 923,554 | Mill | June 1, 1909 |
| 1,348,316 | Perrault | Aug. 3, 1920 |
| 1,592,933 | Hammond et al. | July 20, 1926 |
| 1,753,299 | Nicholas | April 8, 1930 |
| 1,813,340 | Conti | July 7, 1931 |
| 2,321,735 | Clifford | June 15, 1943 |
| 2,586,424 | Gazette | Feb. 19, 1952 |
| 2,670,576 | Hockett | Mar. 2, 1954 |
| 2,696,883 | Broden | Dec. 14, 1954 |
| 2,701,015 | Gottschalk | Feb. 1, 1955 |
| 2,716,449 | Larsen | Aug. 30, 1955 |

FOREIGN PATENTS

| | | |
|---|---|---|
| 679,988 | Great Britain | Sept. 24, 1952 |